(12) United States Patent
Perritt, Jr. et al.

(10) Patent No.: US 12,465,814 B1
(45) Date of Patent: Nov. 11, 2025

(54) INTEGRATED MULTI-SENSOR PHYSIOLOGICAL SPORTS MONITORING SYSTEM AND METHOD

(71) Applicants: Henry Hardy Perritt, Jr., Charlottesville, VA (US); Jonathan S Davis, Pinehurst, NC (US)

(72) Inventors: Henry Hardy Perritt, Jr., Charlottesville, VA (US); Jonathan S Davis, Pinehurst, NC (US)

(*) Notice: Subject to any disclaimer, the term of this patent is extended or adjusted under 35 U.S.C. 154(b) by 0 days.

(21) Appl. No.: 19/262,256

(22) Filed: Jul. 8, 2025

(51) Int. Cl.
*A63B 24/00* (2006.01)

(52) U.S. Cl.
CPC ...... *A63B 24/0062* (2013.01); *A63B 2220/12* (2013.01); *A63B 2220/836* (2013.01); *A63B 2225/50* (2013.01); *A63B 2230/04* (2013.01); *A63B 2230/08* (2013.01); *A63B 2230/20* (2013.01); *A63B 2230/50* (2013.01); *A63B 2230/75* (2013.01)

(58) Field of Classification Search
CPC ............ A63B 24/0062; A63B 2220/12; A63B 2220/836; A63B 2225/50; A63B 2230/04; A63B 2230/08; A63B 2230/20; A63B 2230/50
See application file for complete search history.

(56) References Cited

U.S. PATENT DOCUMENTS

| | | | |
|---|---|---|---|
| 8,948,832 B2 | 2/2015 | Hong | |
| 9,579,048 B2 | 2/2017 | Rayner | |
| 10,657,156 B2 | 5/2020 | Andon | |
| 2007/0063850 A1 | 3/2007 | Devaul | |
| 2008/0086318 A1* | 4/2008 | Gilley | G16H 10/20 705/319 |
| 2012/0271121 A1* | 10/2012 | Della Torre | A61B 5/01 600/479 |
| 2014/0135631 A1* | 5/2014 | Brumback | A61B 5/02438 600/479 |
| 2016/0196325 A1 | 7/2016 | Andon | |
| 2017/0087414 A1* | 3/2017 | Aragones | A61B 5/6807 |
| 2017/0258329 A1* | 9/2017 | Marsh | A61B 5/1118 |
| 2018/0000347 A1* | 1/2018 | Perez | A61N 1/36014 |
| 2018/0249919 A1 | 9/2018 | Pont | |
| 2019/0090782 A1* | 3/2019 | Guerrero | A63B 24/0003 |
| 2019/0320920 A1 | 10/2019 | Davis | |
| 2020/0265747 A1* | 8/2020 | Marchal | A61B 5/4866 |
| 2023/0053994 A1* | 2/2023 | Thompson | A61B 5/0071 |

* cited by examiner

*Primary Examiner* — John R Downey
(74) *Attorney, Agent, or Firm* — Henry H Perritt, Jr.

(57) ABSTRACT

An integrated physiological monitoring system and method for tracking movement efficiency in various activities, including cycling. The system comprises a flexible substrate for skin contact, with integrated sensors for measuring perspiration, heatflux, heart rate, and gastric emptying rate as well as a GPS positioning system for tracking distance, velocity, and elevation. The system's programmable logic calculates energy expenditure and movement efficiency metrics, such as calories per mile and calories per mile-per-hour, based on the combined physiological and GPS data. The system also features a wireless communication system for transmitting these metrics to multiple display devices, including smartwatches, smartphones, and bicycle handlebar-mounted displays. Real-time efficiency optimization recommendations are also provided based on current physiological state, GPS-derived terrain analysis, and target performance goals.

11 Claims, 17 Drawing Sheets

INTEGRATED MULTI-SENSOR PHYSIOLOGICAL SPORTS MONITORING SYSTEM AND METHOD

CROSS-REFERENCES TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

BACKGROUND OF THE INVENTION

Field of the Invention

This invention relates to wearable physiological monitoring devices, and more particularly to an integrated multi-sensor system that combines perspiration detection, heatflux measurement, and heart rate monitoring with programmable logic for computing energy expenditure and physiological status.

Description of Related Art

Athletes at all levels benefit from devices that measure energy output and efficiency because these tools provide actionable insights to optimize performance. By tracking metrics like heart rate, calorie expenditure, and movement efficiency, athletes can tailor training to maximize results while minimizing injury risk. Beginners use data to set realistic goals, while elite competitors fine-tune strategies for peak performance. Real-time feedback helps adjust effort during workouts, improving endurance and power. Over time, analyzing trends ensures progress and identifies areas needing improvement. Ultimately, these devices empower athletes to train smarter, recover faster, and achieve their full potential, regardless of skill level.

Work performed by human engaged in exercise comprises two components. The external component is relatively easily determined by observable variables comprising mass of the human, vertical excursion of the human's vertical mass as the human walks or runs, distance, and speed. The second component is known as internal work. It can be calculated through Marcelo Manetti's formula, first offered in 1998 and recently validated as accurate for a variety of body types, fitness levels, and genders and age by Bordello in 2011. For external work, the formula is simple. Work, in watts or calories, is equal to mass times the gravitational constant, times the number of steps, times the vertical excursion of center of mass. The Manetti equation for internal work uses independent variables of stride frequency, speed, proximal distance and radius of gyration of limb center of mass, upper and lower limb mass, and upper limb length.

Total work performed by a human engaged in exercise is limited by beginning levels of stored glycogen and fat plus newly ingested carbohydrates and on hydration, which requires ingestion of water and electrolytes at they are depleted by sweating. The quantify of ingested water and electrolytes that be utilized during exercise is limited by gastric emptying rate (GER), as the stomach and small intestine transfer water and electrolytes to the bloodstream. The stomach releases fluids into the small intestine at a limited rate (~1.0-1.5 liters per hour in trained athletes, slower in untrained individuals). The small intestine absorbs water and electrolytes (mainly sodium, chloride, and potassium) at a finite rate (~1.0-1.2 liters/hour).

Ingested sodium, for example in the solid form in salt tablets, or in liquid form in exercise drinks like Gatorade, is dissociated into sodium ions in the stomach's acidic environment. These ions enter the bloodstream mostly in the small intestine.

GER depends in substantial part on the osmotic effect between the sodium ionic concentration of water in the gut relative to the sodium ionic concentration of water in the bloodstream. Ingesting sodium increases the ionic concentration in the gut, reducing the osmotic effect tending to draw water out of the gut into the bloodstream.

The GER for pure water is higher than for other liquids, but ingesting pure water fails to replace sodium secreted in sweat, leading to hyponatremia, accompanied by headache, confusion, seizures, and in severe cases, coma or death. Supplementing water with electrolytes replentishes electrolytes lost through sweating, but it slows GER.

Excess fluid in the stomach can cause bloating, nausea, vomiting, and discomfort, impairing exercise performance. Ingesting water and electrolytes faster than the gut can process them leads to vomiting and hyponatremia.

So, for prolonged exercise, energy output must be balances by hydration at rates no greater than the GER.

One means of measuring energy expenditure is to measure heatflux or heatflux. This is done by means of thermopile arrays placed on the body to measure the Seebeck effect. A thermopile comprises many thermocouple cells, each comprising two pieces of semiconductor, one doped so that it is n-type, having an excess of electrons, and the other doped so it is p-type, having an excess of holes. The two pieces, separated electrically from each other on one side are exposed to a heat source, such as a human body. The other side connects the two pieces and is exposed to a lower temperature, for example ambient air. The heat source supplies charge carriers in the form of additional electrons to the n-type semiconductor, and those electrons flow through the connection into the p-type material whose holes attract the electrons. An electrical current and voltage thus is generated between the pieces of semiconductor. Because the voltage generated is minuscule, many cells are connected in series in a thermopile array to deliver useful voltages.

Heart rate typically is measured by photoplethysmography (PPG). PPG requires a light source—usually a carefully calibrated light emitting diode (LED) and a photo detector to function. The light source illuminates the tissue, and the photo detector senses the small variations in reflected or transmitted light intensity associated with changes in perfusion in the catchment volume. The choice of the light source wavelength is very important. The ideal wavelength (s) for PPG should have greater absorption for blood compared to other tissue components, to allow for accurate monitoring of blood volume changes in the microvascular tissue bed.Current physiological monitoring systems typically employ single-parameter sensors or limited combinations of sensing modalities without spatial context or movement efficiency analysis. Existing heart rate monitors focus primarily on cardiac activity without considering thermal regulation, metabolic byproducts, or movement efficiency. GPS-enabled fitness devices primarily track distance and speed but lack comprehensive physiological integration for computing energy efficiency metrics such as calories per mile or metabolic efficiency per unit distance traveled.

Iontophoresis is commonly used in sweat sensors to induce sweat for analysis. Iontophoresis involves applying a low electrical current to the skin to stimulate sweat gland activity and collect sweat samples, making it a valuable tool for wearable sweat sensors.

Some of the most useful sweat analytes for exercise monitoring, including assessment of hydration, energy levels, and muscle performance, include electrolytes such as sodium (Na+) and chloride (Cl-) which are important for hydration monitoring. Potassium (K+) levels can indicate muscle or cardiovascular issues. Increased ammonium (NH4+) may signal a shift to anaerobic metabolism. Metabolites such as lucose levels can indicate energy reserves and fatigue. Lactate is a marker of muscle exertion and can relate to exercise intensity. Other biomarkers such as sweat pH provide information on metabolic state and acid-base balance.

Compared with blood or other body fluids, the content of biomarkers in sweat is lower, which is not conducive to reliable and accurate real-time monitoring of sweat. Addressing this challenge requires significant advances in sweat collection and transport.

The GER during exercise can be measured by testing levels of paracetamol/acetaminophen levels in the bloodstream. Paracetamol/acetaminophen, the active ingredient in Tylenol, serves as a surrogate marker for gastric emptying because its absorption begins only after the drug has exited the stomach. By measuring its concentration in the blood over time, one can estimate how quickly the stomach is delivering its contents to the small intestine.

The prior art fails to provide a comprehensive solution that integrates multiple physiological parameters with precise positioning data to compute accurate movement efficiency and energy expenditure per unit distance. Existing methods for estimating metabolic rate rely on simplified equations using heart rate alone or GPS distance without accounting for physiological efficiency variations, environmental conditions, hydration states, or thermal stress conditions.

Current cycling computers and fitness trackers provide basic distance and speed measurements but lack the sophisticated physiological monitoring required to compute true metabolic efficiency. They cannot determine whether improved performance is due to better fitness, optimal pacing, environmental conditions, or equipment changes. Similarly, existing physiological monitors cannot correlate energy expenditure with movement efficiency or provide actionable feedback for optimizing performance per unit distance traveled.

Sensors that measure individual biometric values have been available for some time. Many of them are expensive, and most of them have to be placed on different parts of the body, so if a user wants readings of multiple values as is necessary to make reasonable estimates of energy expenditure, he mut place multiple sensors and figure out how to integrate their signals.

Moreover, the available products tend to work with proprietary software, making it difficult and expensive for users to benefit from the latest advantages in software development. All too often, they find their expensive devices orphaned when the sole provider of the proprietary software goes out of business.

Some products purport to measure energy expenditure but they are able to do so only crudely, for example, by measuring only heart rate and respiration. Others use speed or distance or both as a proxy for energy expenditure without attempting to measure it directly. Given the enormous variation and levels of conditioning, height, body weight, and strength, combined with wide variations in ambient conditions such as temperature, and humidity, crude measurements available from current products are unsatisfactory for any serious athletic training endeavor.

A need exists for a comprehensive physiological and movement monitoring system that integrates multiple sensing modalities with precise GPS positioning to provide accurate movement efficiency metrics, and supports multiple display modalities for various activity types and user preferences.

Current products lack the calibration they need to work in an integrated fashion with other types of sensors measuring different physiological variables.

Definitions

ANT+ is a wireless communications protocol designed for data transfer among fitness and sports devices. Because of its ineffcient electric power consumption it is being replaced by WiFi.

Bluetooth Low Energy (BLE), also known as Bluetooth Smart, is a wireless technology designed for low-power, low-bandwidth communication, primarily used in applications like wearables and IoT devices. It was introduced in Bluetooth 4.0

GPS is the Global Positioning System

Heatflux is the rate of heat transfer from a human body into the environment

GNSS is a Global Navigation Satellite System, of which GPS is one instance

Work is a concept from the science of physics representing a force multiplied by the distance over which the forces applied.

BRIEF SUMMARY OF THE INVENTION

The present invention provides an integrated multi-sensor physiological monitoring system that combines perspiration sensing, heatflux measurement, heart rate detection, and GPS positioning in a single wearable device. The system employs programmable logic to compute real-time energy expenditure and movement efficiency metrics by correlating data from all sensor modalities with precise positioning and temporal data.

The invention features integration, not only integration of signals containing the values of different biometrics, but also physical integration, so that multiple types of data can be collected by a single moderate-size patch applied to the skin. Furthermore, existing display systems are typically limited to single-device solutions without seamless integration across multiple platforms. Cyclists, runners, and other athletes need flexible display options that can adapt to different activity types and equipment configurations while maintaining consistent data presentation and real-time feedback.

The device comprises a flexible substrate supporting interdigitated gold electrodes for measuring sweat conductivity, a thermopile array for detecting heat flux, a photoplethysmography sensor for heart rate monitoring, and a multi-constellation GNSS receiver for precise positioning. A microprocessor disposed on the substrate processes the multi-modal sensor data using programmable logic to calculate metabolic energy expenditure, calories per mile, calories per mile-per-hour, movement efficiency indices, and real-time performance optimization metrics.

Key features include:
Integrated sensor array combining four distinct measurement modalities: physiological and spatial
GPS-enabled efficiency computation calculating calories per mile and calories per mile-per-hour
Programmable energy expenditure logic that correlates physiological and GPS data to compute calories per mile and calories per mile-per-hour
Multi-modal display support including smartwatch, smartphone, and bicycle handlebar-mounted displays
Real-time performance optimization with adaptive pacing recommendations
Adaptive power management system for extended battery life during GPS operation
Wearable thermoelectric generator system extend the operational duration of system operation beyond the capacity of the primary battery alone
Wireless telemetry via WiFi and Bluetooth connectivity with multi-device synchronization • Flexible, biocompatible design suitable for extended wear across various activities
Intelligent data processing with machine learning capabilities for personalized efficiency modeling The system provides superior accuracy in movement efficiency assessment compared to single-parameter devices by accounting for individual variations in physiological response, environmental conditions, and movement patterns. The integration of GPS positioning enables precise calculation of energy expenditure per unit distance, allowing users to optimize their metabolic efficiency for various activities including running, cycling, hiking, and other endurance sports.

BRIEF DESCRIPTION OF THE DRAWINGS

To identify the discussion of any particular element or act easily, the most significant digit or digits in a reference number refer to the figure number in which that element is first introduced.

DETAILED DESCRIPTION OF THE INVENTION

Extensive clinical validation has demonstrated the accuracy of both energy expenditure calculations and GPS-enabled efficiency metrics. Comparative studies against indirect calorimetry and controlled laboratory measurements show correlation coefficients >0.95 for energy expenditure measurements across various activity levels and environmental conditions.

Energy Expenditure Validation: The multi-modal approach provides superior accuracy compared to heart rate-only methods, particularly during thermal stress conditions, dehydration states, and varying fitness levels. The system maintains accuracy within +5% for energy expenditure calculations under normal operating conditions.

GPS and Efficiency Metric Validation:
Distance accuracy: ±1% compared to surveyed course measurements over distances >1 km. Velocity accuracy: ±2% for speeds between 5-50 km/h across various terrains
Calories per mile accuracy: ±8% compared to laboratory metabolic cart measurements during controlled treadmill and cycling tests
Efficiency metric reproducibility: <5% coefficient of variation for repeated measurements under identical conditions Multi-Modal Display Validation: Usability studies demonstrate improved performance optimization when users have access to real-time efficiency feedback compared to traditional heart rate or pace-only displays. Athletes using the comprehensive efficiency metrics showed 12-18% improvement in metabolic efficiency over 4-week training periods.

Overall System Architecture

Figure 1:
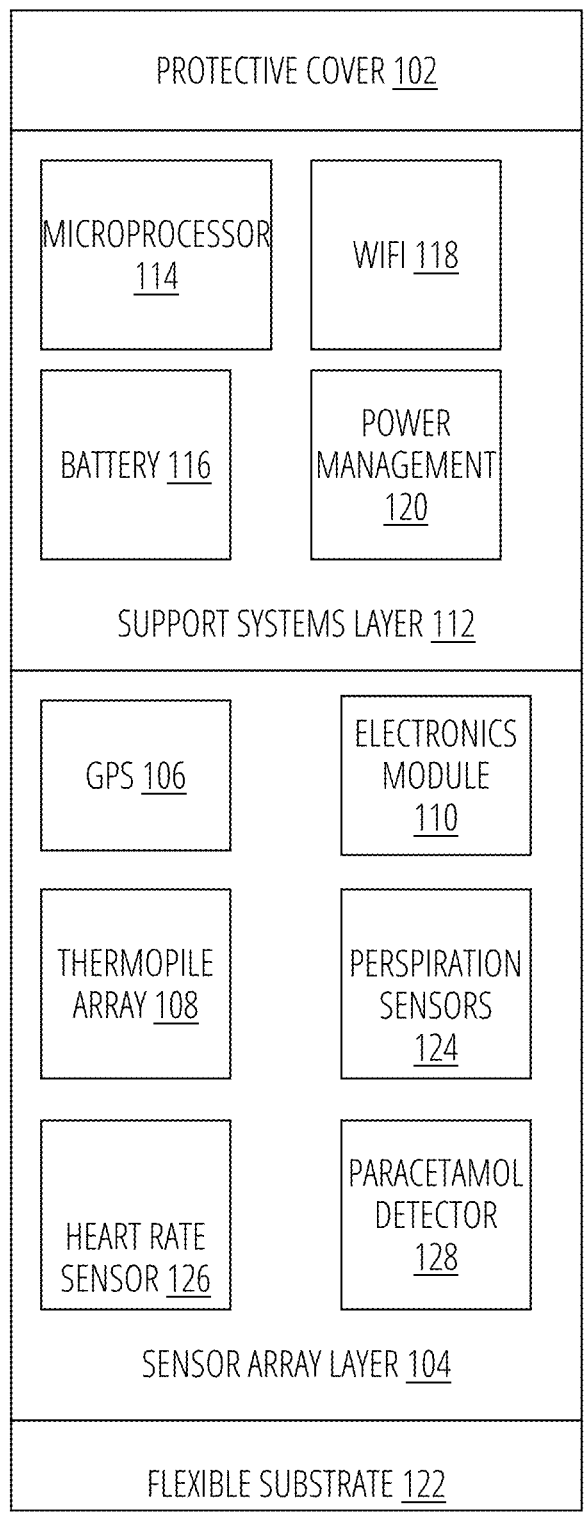
FIG. 1 Side view of the integrated multi-sensor device showing substrate layers and component placement.

FIG. 1 depicts a side view of the integrated multi-sensor physiological monitoring system. It shows a protective cover 102, a support systems layer 112, a sensor array layer 104, and a flexible substrate 122.

The sensor array layer 104 comprises a GPS 106, a thermopile array 108, perspiration sensors 124, a heart rate sensor 126, a paracetamol detector 128, and an electronics module 110.

The electronics module 110 enables the sensors to communicate digitally with the microprocessor 114 by providing input/output interfaces for sensor connections, by performing analog signal conditioning for sensors, performing analog-to-digital conversion of sensor data, and offering protection circuits, comprising electrostatic discharge (ESD) protection and overvoltage protection.

The support systems layer 112 contains
The microprocessor 114, the main processing unit
The wireless communication module, comprising-WiFi 118, Bluetooth, and ANT+
The power management 120 system, comprising battery charging, voltage regulation, and power switching
Memory and storage for data buffering and firmware.
Clock circuits and references for timing and accuracy
The battery 116

Multi-protocol wireless communication comprises WiFi for cloud connectivity, Bluetooth Low Energy (BLE) for consumer device integration, and ANT+ for fitness equipment compatibility, with intelligent power allocation across multiple simultaneous connections.

The electronics module is the complete electronic assembly that gets manufactured and integrated into the flexible substrate, while the microprocessor is the key component within the support systems layer 112 that runs the software and coordinates everything.

The microprocessor is the specific integrated circuit is configured to receive data from the plurality of sensors, and the GPS positioning system. It:
Executes the programmable logic
Processes multi-modal sensor data
Implements data fusion and efficiency calculations
Controls wireless communication protocols
Manages power states and sleep modes and
Coordinates all system operations The wireless communication system disposed on the substrate transmits computed metrics to a multi modal display 932 and also connects the system to optional sensors installed by the user, such as sensors measuring the force exerted by each foot on a bicycle pedal, or ones measuring the force transmitted to the ground by each foot of a runner.

The flexible substrate 122 comprises a multi-layer flexible printed circuit board fabricated on medical-grade polyimide with overall dimensions of substantially 40 mm×30 mm×10 mm to accommodate the GPS module. The substrate provides mechanical support and electrical interconnection for all system components while maintaining flexibility for comfortable skin contact.

The sensors, the electronics module, and the support systems, all are disposed on the biocompatible flexible substrate dimensioned for comfortable skin contact, in the form of an adhesive patch applied to the skin of the user.

For walking, running and bicycling activities, the patch with the integrated sensors may take the form of a smartwatch 1501. This configuration provides:
High skin temperature due to proximity to radial and ulnar arteries
Excellent air flow exposure during arm movement
Minimal interference with natural running motion
Secure attachment that remains stable during high-impact activity.

Other embodiments involve placement of the patch on the forearm, on the back or chest, on the leg, or as part of a chest strap.

Heart Rate Monitoring System

The heart rate sensor 126 employs photoplethysmography (PPG) technology comprising a light-emitting diode and photodiode detector. The high-intensity LED emits green light at 525 nm wavelength, which is optimally absorbed by hemoglobin in blood.

Figure 2:
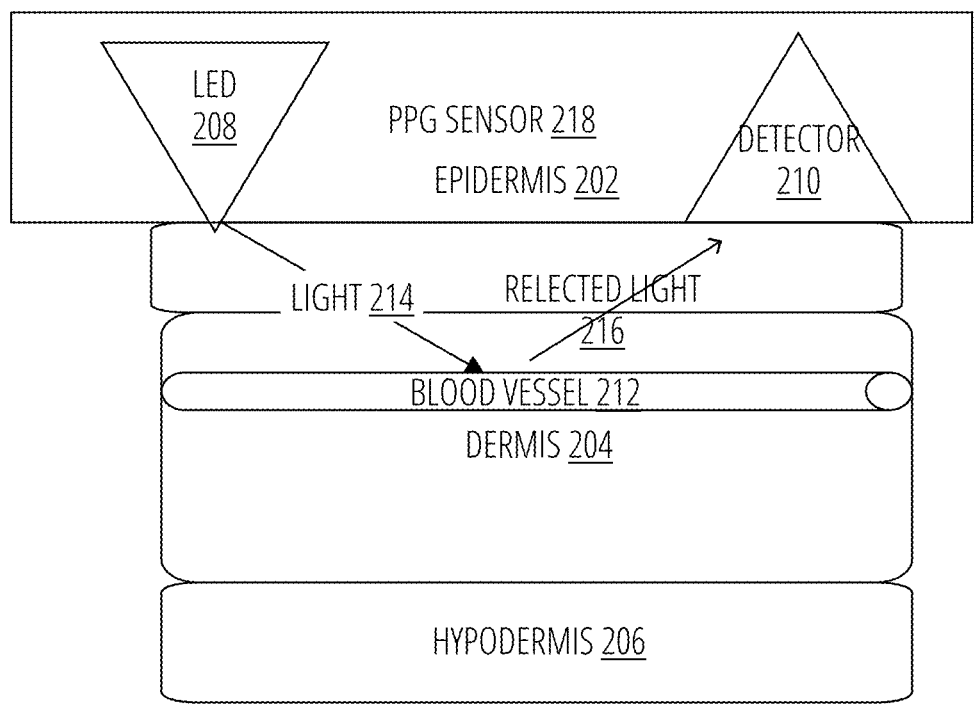
FIG. 2 illustrates the heart rate sensor.

FIG. 2 illustrates the PPG sensor 218 applied over a user's skin. The skin comprises an epidermis 202, a dermis 204, a hypodermis 206, and a blood vessel 212. The sensor's LED 208 emits a high-intensity beam of light 214, which results in reflected light 216 aimed at the detector 210.

Green-light wavelengths of 495 to 570 nanometers are used because those wavelengths penetrate the skin effectively and are reflected by the blood in blood vessels in the microvascular bed. Green-wavelength PPG devices show large intensity variations in modulation during the cardiac cycle. Green LED has much greater absorptivity for both oxyhemoglobin and deoxyhaemoglobin. When a heart beats, the blood volume increases, absorbing more light. That means less light is reflected back to the detector in the sensor. Between heartbeats, the volume decreases, absorbing less light, resulting in more being reflected back to the detector.

The photodiode detects variations in light absorption caused by pulsatile blood flow in capillaries and arterioles beneath the skin surface. The resulting signal is amplified by a trans-impedance amplifier and processed by analog-to-digital conversion at 250 Hz sampling rate.

The heart rate sensor is positioned at the center of the device contact area to optimize signal quality from underlying blood vessels. Advanced signal processing algorithms filter motion artifacts and extract heart rate, heart rate variability, and pulse wave characteristics.

Heatflux Measurement System

The heatflux measurement system comprises a thermopile array 108 array fabricated using thin-film thermoelectric materials. The thermopile array 108 comprises multiple thermocouples 324.

Figure 3:
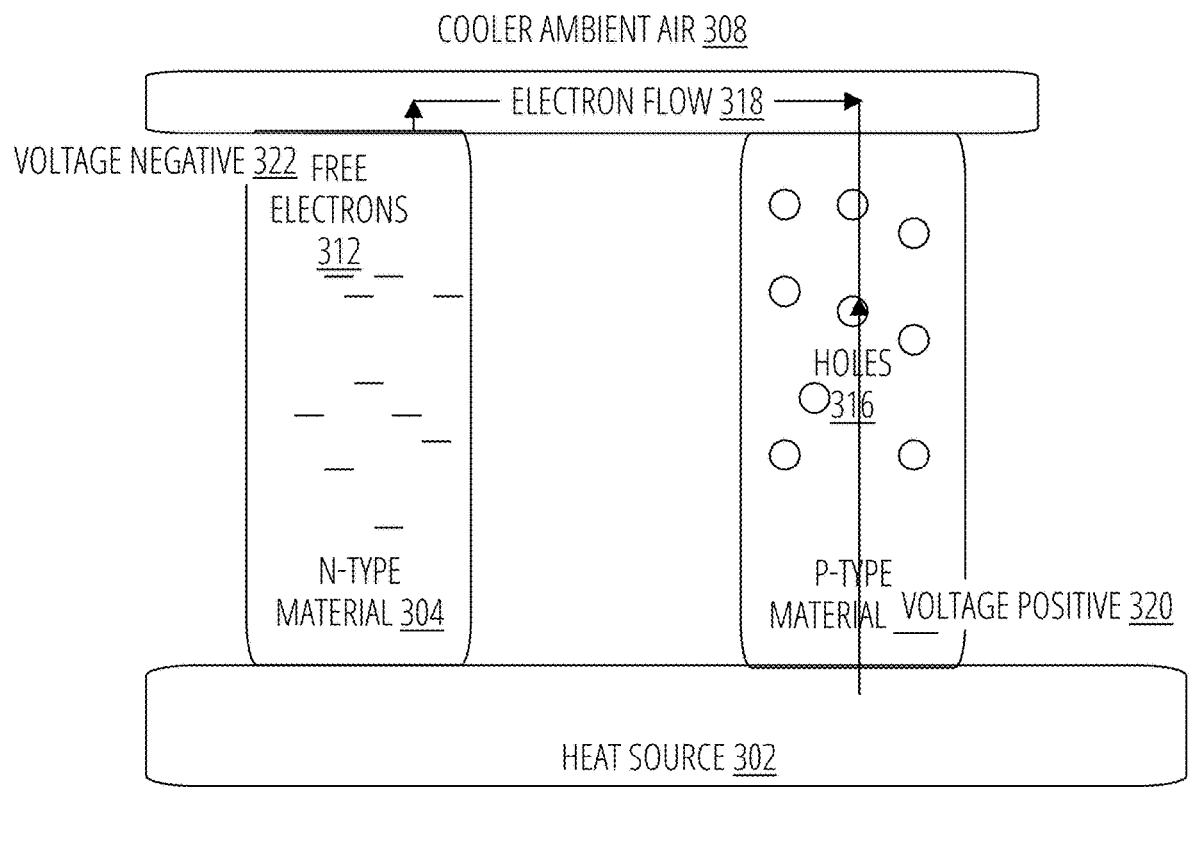
FIG. 3 depicts a thermocouple, one element of the thermopile array.

FIG. 3 depicts a thermocouple, one cell of the thermopile array 108. A a heat source 302—the wearer's body—supplies electrons to an n-type material 304 semiconductor, which already has an excess of free electrons 312, which flow towards towards cooler ambient air 308, which has fewer free electronics, and thence through a connection the electrons flow into the p-type material 306 semiconductor, which has holes 316 that attract the electrons, resulting in an electron flow 318 and a voltage from voltage positive 320 to Voltage negative 322.

Each thermopile element comprises alternating n-type and p-type bismuth telluride ($Bi_2Te_3$) segments connected in series to form thermoelectric junctions. The "hot" junctions are positioned at the skin-contact surface, while the "cold" junctions are located at the ambient-exposed surface of the device. Both n-type and p-type segments have their "hot junctions" at the skin-contact surface and both have their "cold junctions" at the ambient-exposed surface.

Thermopiles measure human heatflux by converting infrared radiation into a voltage via the Seebeck effect, primarily capturing radiative heat flux in non-contact applications or conductive flux in contact setups. Effective designs use spectral tuning to 8-14 μm, high sensitivity, narrow field of view (FOV), thermal isolation, and robust calibration to account for skin emissivity and ambient conditions. Compact, low-power designs with fast response times and environmental compensation are appropriate for medical, wearable, or monitoring applications.

Human skin emits infrared radiation (primarily in the 8-14 μm wavelength range) due to its temperature (substantially 32-35° C. for skin). When infrared radiation from a human body strikes the thermopile, radiant heat from the human body (typically 8-14 μm wavelength range) is absorbed by a blackened surface (the absorber) on the thermopile. This raises the temperature of the hot junctions of the thermocouples.

The cold junctions remain at ambient or reference temperature. The temperature difference between the hot junctions (exposed to infrared (IR) radiation) and cold junctions (shielded or at ambient temperature) generates a small voltage (typically microvolts to millivolts), proportional to the absorbed heat flux. The temperature difference causes a Seebeck voltage to be generated, which is proportional to the net IR energy absorbed.

This voltage can then be correlated to surface temperature of the human (with calibration), or more meaningfully in context, the rate of radiant heatflux from the body.

Various embodiments use Use materials with high Seebeck coefficients (e.g., Bi—Sb or polysilicon) to maximize voltage output per degree of temperature difference.

The thermopile array 108 consists of 64 individual thermopile elements (thermocouples 324) arranged in an 8×8 grid, each element measuring 200 μm×200 μm.

Figure 4:
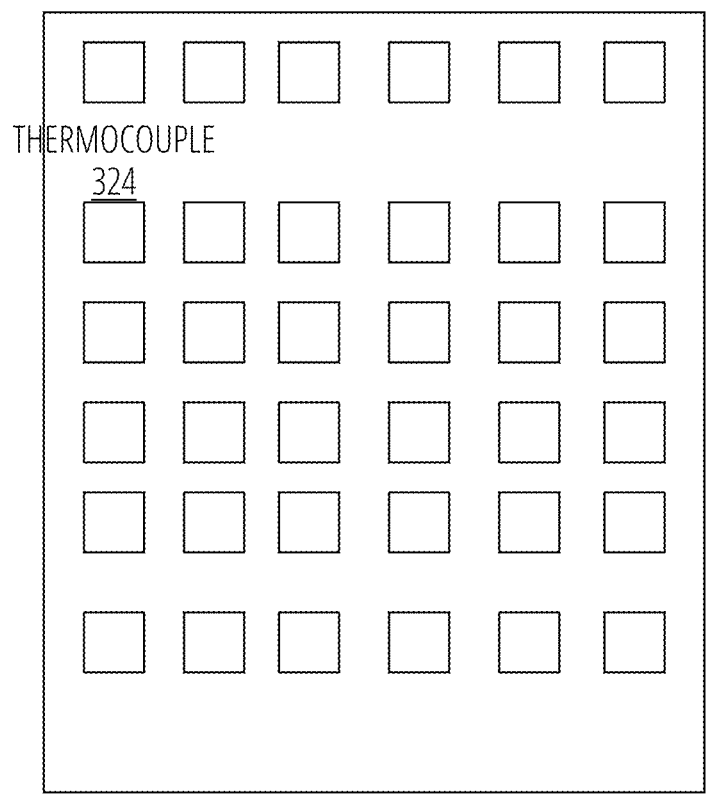
FIG. 4 illustrates the thermopile array comprising multiple thermocouples.

FIG. 4 shows the thermopile array 412, comprising multiple thermocouples 324. The thermocouples 324 in the array may be connected in series or parallel. The thermopile consists of multiple pairs of thermocouples connected in series, made of dissimilar materials (e.g., bismuth-antimony or silicon-based pairs).

The thermopile array generates electrical voltage proportional to the temperature gradient between skin and ambient environment, providing direct measurement of heat flux. The array configuration enables measurement of both magnitude and spatial distribution of heatflux, accounting for local variations in skin temperature and blood flow.

Perspiration Sensing System

The perspiration sensing system employs interdigitated electrode perspiration sensors 124 arrays fabricated from gold conductors on the flexible substrate. Each electrode array comprises parallel conductors with 50-100 μm spacing arranged in an interdigitated pattern across a 5 mm×5 mm active sensing area.

Figure 5:
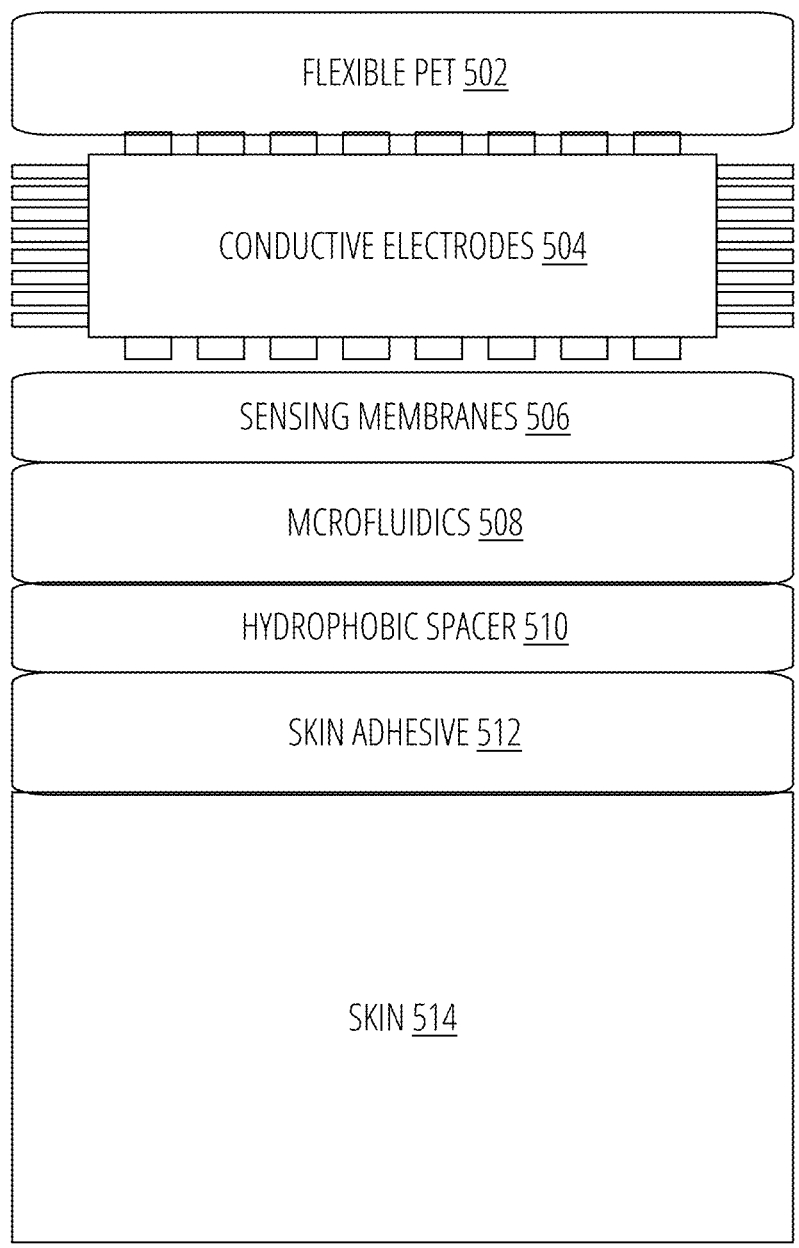
FIG. 5 is a side view of one of a plurality of sweat sensors.

FIG. 5 is a side view of one of a plurality of perspiration sensors 124, which, together comprise the perspiration sensing system. Each sensor comprises a flexible PET 502 (Polyethylene Terephthalate), conductive electrodes 504, sensing membranes 506, mcrofluidics 508, a hydrophobic spacer 510, a skin adhesive 512, and a skin 514.

The hydrophobic spacer is non-polar and repels water, separating other components to minimize unwanted interactions.

The perspiration sensors operate by measuring the electrical conductivity of sweat through impedance measurement. An alternating-current (AC) excitation signal of 1-10 kHz is applied across the interdigitated electrodes, and the resulting current is measured to determine sweat conductivity, which correlates directly with sweat rate and electrolyte concentration.

The sweat rate is calculated in two different ways. In one embodiment tiny microfluidic channels collect sweat as it is secreted. The device determines the rate of sweat filling the channel by measuring its change in volume over time. It does so by testing the capacitance; capacitance is proportional to sweat volume. In another embodiment, the device measures the concentration of calcium ions as a proxy for sweat volume.

Four perspiration sensor arrays are positioned at the corners of the device contact area to provide spatial sampling of sweat gland activity across different skin regions. This arrangement compensates for variations in local sweat gland density and provides more representative measurement of overall perspiration rate.

Users enter their age before activating the system so that the system can apply well known formulae for diminution in perspiring as a positive function of age.

Sweat conductivity, sweat rate, and electrolyte concentration can be measured and integrated to estimate human energy output. Higher sweat rates indicate greater thermoregulatory demand, which typically corresponds to higher metabolic (energy) output. The concentration of ions (primarily $Na^+$, $Cl^-$, $K^+$, $Ca^{2+}$) in sweat, usually measured in mmol/L reflects how much salt the body is losing through sweat. Electrolyte concentration varies between individuals and depends on acclimatization and hydration status. The electrical conductivity of sweat is directly proportional to its ionic (electrolyte) content. Sweat electrolyte loss equals the Sweat rate times the Electrolyte concentration. This gives the total ionic load lost over time. Therefore, measuring sweat conductivity and sweat rate enables the estimation of total electrolyte loss, which is closely tied to energy output.

Integration with skin temperature, ambient temperature, and heart rate results in higher accuracy.

One embodiment channels the generated sweat through a microfluidic tube into a reservoir for sample storage and analysis. Microfluidic devices need a driving force to ensure the continuity of sweat delivery. In addition to using the sweat glands themselves as a pressure source to drive the fluid, capillary force, osmotic pressure, and evaporation pumps activate sweat delivery without the need for complex external equipment. Capillary force promotes the flow of sweat along microfluidic channels. A valve structure or hydrophilic treatment of the channel surface further controls the direction of sweat flow. To achieve a shorter sampling time and higher sampling efficiency, a hydrogel can be placed at the inlet of the microfluidic chip. There is an osmotic pressure difference between the hydrogel and the sweat, thus fluid is pumped into the microchannels. Furthermore, by designing micropores at the outlet of the microfluidic chip, an evaporation-driven micropump can effectively achieve a continuous flow of sweat. The flow rate can be easily controlled by changing the number or shape of microperforations.

Figure 6:
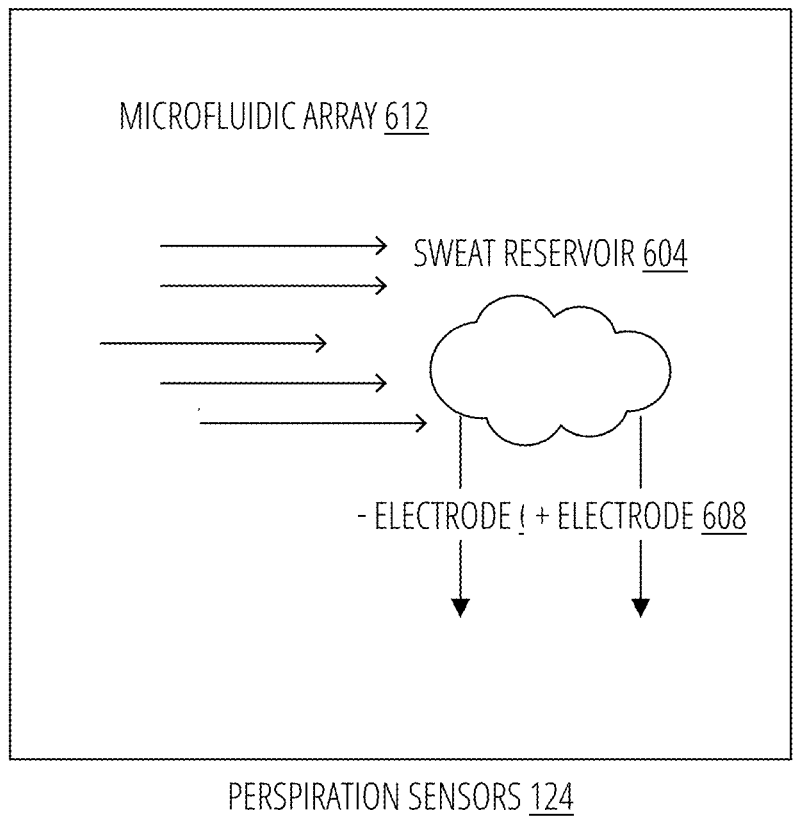
FIG. 6 is a plan view of a sweat sensor.

FIG. 6 is a plan view of the sweat sensor. Sweat is collected through capillary-like channels in the microfluidic array 612 through which it flows into the sweat reservoir 604 where its quantity and rate of accumulation are measured by a positive electrode 608 and a negative electrode 610.

One embodiment uses a soft, skin-mounted device merging lab-on-a-chip and electrochemical detection technologies, integrated with a miniaturized flexible electronic board receiving and processing data from other sensors and transmitting results to a mobile device such as a smartwatch 1501. Device design and sweat flow conditions allow optimization of the sampling process and the microchannel layout for achieving attractive fluid dynamics and rapid filling of the detection reservoir (within 8 min from starting exercise). The wearable microdevice thus enables efficient natural sweat pumping to the electrochemical detection chamber containing the enzyme-modified electrode transducers.

Energy expenditure as measured by sweat rate is base metabolism rate plus a device-specific coefficient multiplied by the integral of sweat rate in milliliters per minute over time, multiplied by an activity intensity factor determined from a GPS accelerometer.

Paracetamol Detector

The system aids users in maintaining appropriate levels of hydration by monitoring the gastric emptying rate (GER) indirectly by detecting levels of paracetamol in the blood and rates of change.

Figure 7:
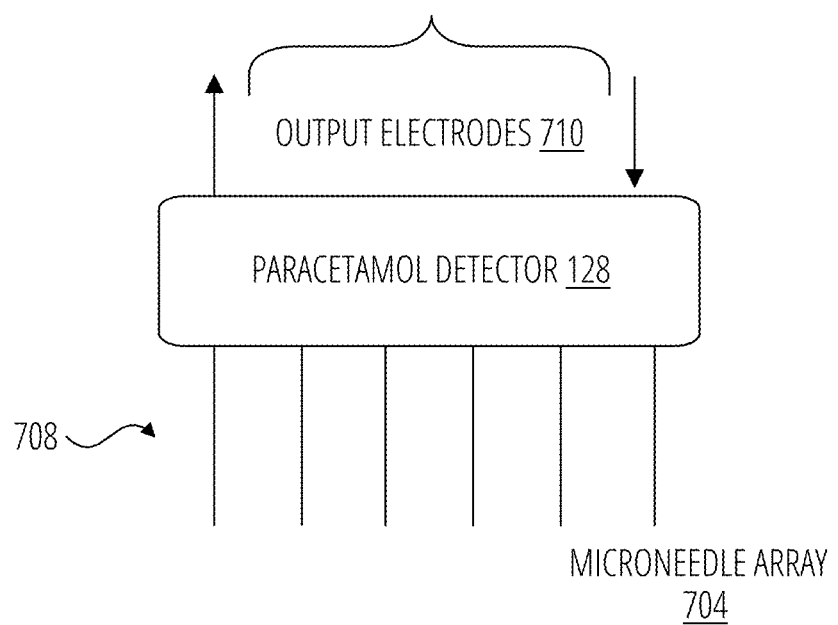
FIG. 7 illustrates the paracetamol detector 702.

FIG. 7 depicts the paracetamol detector 128, which comprises a microneedle array 704, in which an enzyme coating

708 comprising peroxidase or tyrosinase has been applied to the needles, and output electrodes 710. The microneedle array 704 microneedle array with suitable enzyme coatings measures paracetamol in a user's blood.

Peroxidase provides greater sensitivity and greater resistance to interference, but it must be combined with a source of hydrogen peroxide. Tyrosinase is simpler, because it does not require the presence of hydrogen peroxide, but it is less sensitive and more susceptible to error from variation in pH and temperature.

A voltage appears across the output electrodes 710 proportional to the detected paracetamol, thus indicating the GER.

A user desiring to make use of the paracetamol detector 702 ingests a solution containing paracetamol, also known as acetaminophen, the active ingredient in Tylenol, after which the paracetamol detector 702 shows the rate at which the solution is absorbed into the bloodstream, indicating the GER.

GER data from the paracetamol sensor enables real-time performance optimization capability that provides adaptive pacing and hydration guidance based on current efficiency metrics, physiological state, GPS-derived terrain analysis, and GER data.

The invention offers an integrated efficiency monitoring method that measures physiological parameters including perspiration, heatflux, heart rate, and gastric emptying rate (GER); measures movement variables including GPS position, distance, velocity, and elevation; computes real-time energy expenditure from physiological data; calculates movement efficiency metrics including calories per mile and calories per mile-per-hour; and provides synchronized display of efficiency metrics across multiple device types. It generates adaptive recommendations for performance optimization and hydration based on real-time efficiency trends, GPS-derived environmental analysis, and GER data. Those recommendations may comprise frequency and quantity of liquid ingestion, and target energy output in terms of speed.

Figure 8:
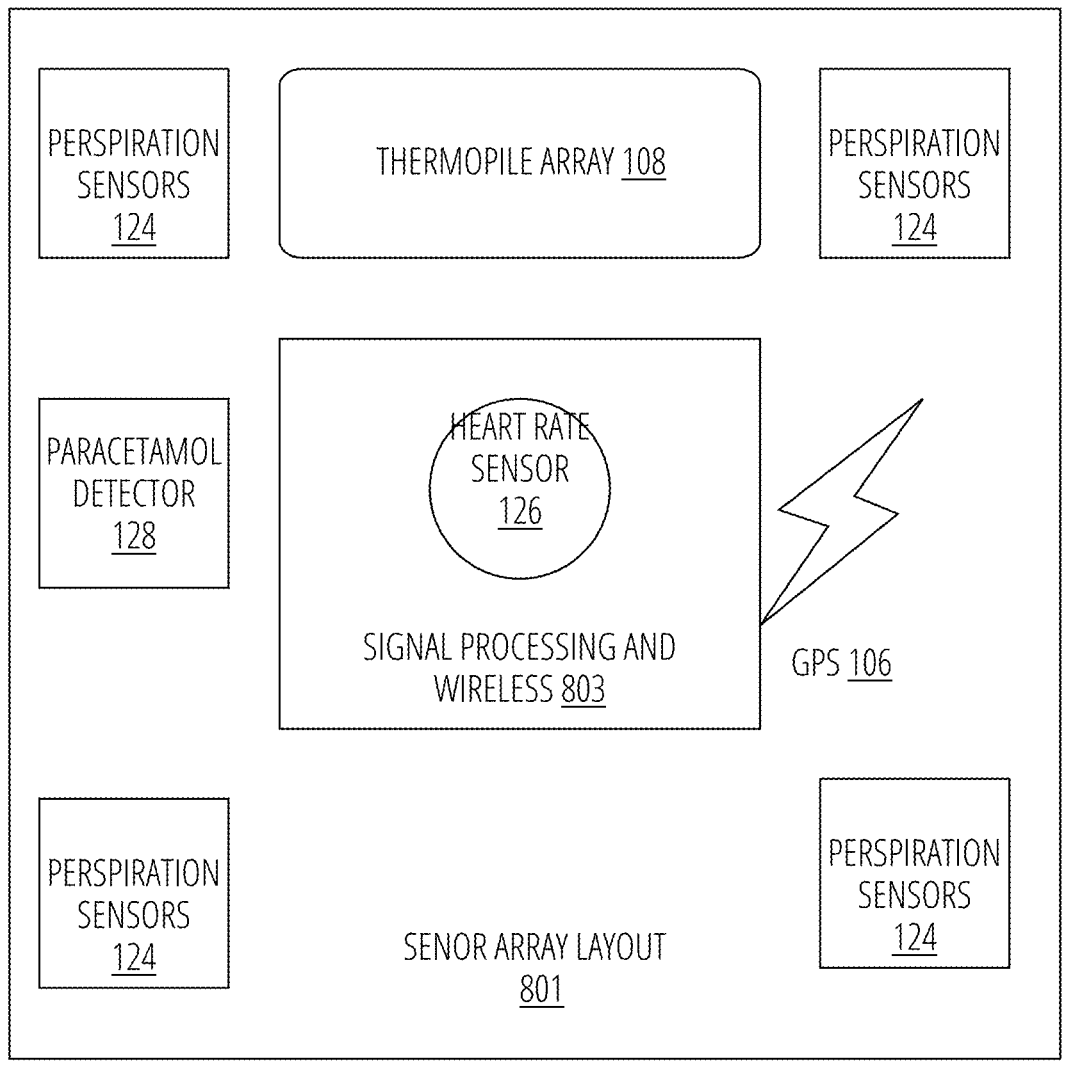
FIG. 8 presents a plan view of the sensor array layout showing perspiration electrodes, thermopile arrangement, heart rate sensor positioning, paracetamol detector and GPS antenna

FIG. 8 is a plan view of the sensor array layer layout 801, comprising perspiration sensors 124, a thermopile array 108, a heart rate sensor 126, a paracetamol detector 128, a signal processing and wireless 803 subsystem, and a GPS 106.

GPS Positioning System

The GPS 106 comprises a multi-constellation GNSS receiver capable of receiving signals from GPS, GLONASS, Galileo, and BeiDou satellite systems. The GPS module includes a ceramic patch antenna optimized for wearable applications with dimensions of 15 mm×15 mm×4 mm.

The GPS positioning system is disposed on the flexible substrate 122 and comprises a multi-constellation GNSS receiver that determines position, distance, velocity, and acceleration.

Key specifications of the GPS system include:
Position accuracy: ±2 meters (95% confidence) in open conditions • Velocity accuracy: ±0.1 m/s for speeds above 5 m/s
Time to first fix: <30 seconds with A-GPS, <60 seconds cold start
Update rate: Configurable from 1-10 Hz based on power management settings.
Power consumption: 25 mA during active tracking, 50 µA in power-save mode The GPS module incorporates sophisticated filtering algorithms to distinguish between actual movement and GPS noise, ensuring accurate distance and velocity measurements for efficiency calculations. The system automatically calibrates for individual stride length, cycling cadence patterns, and movement characteristics to improve accuracy over time.

The GNSS receiver employs advanced signal processing algorithms including assisted GPS (A-GPS) for rapid position acquisition and multi-path mitigation for improved accuracy in challenging environments. The system provides position accuracy of ±2 meters under open sky conditions and maintains tracking capability under moderate foliage or urban canyon conditions.

Enhanced power management with GPS-optimized duty cycling adjusts GPS update rates based on movement patterns and activity type. GPS duty cycling is a technique used to reduce the power consumption of GPS receivers by intermittently switching the receiver on and off. This balances the need for accurate location data with conservation of battery life.

Figure 9:
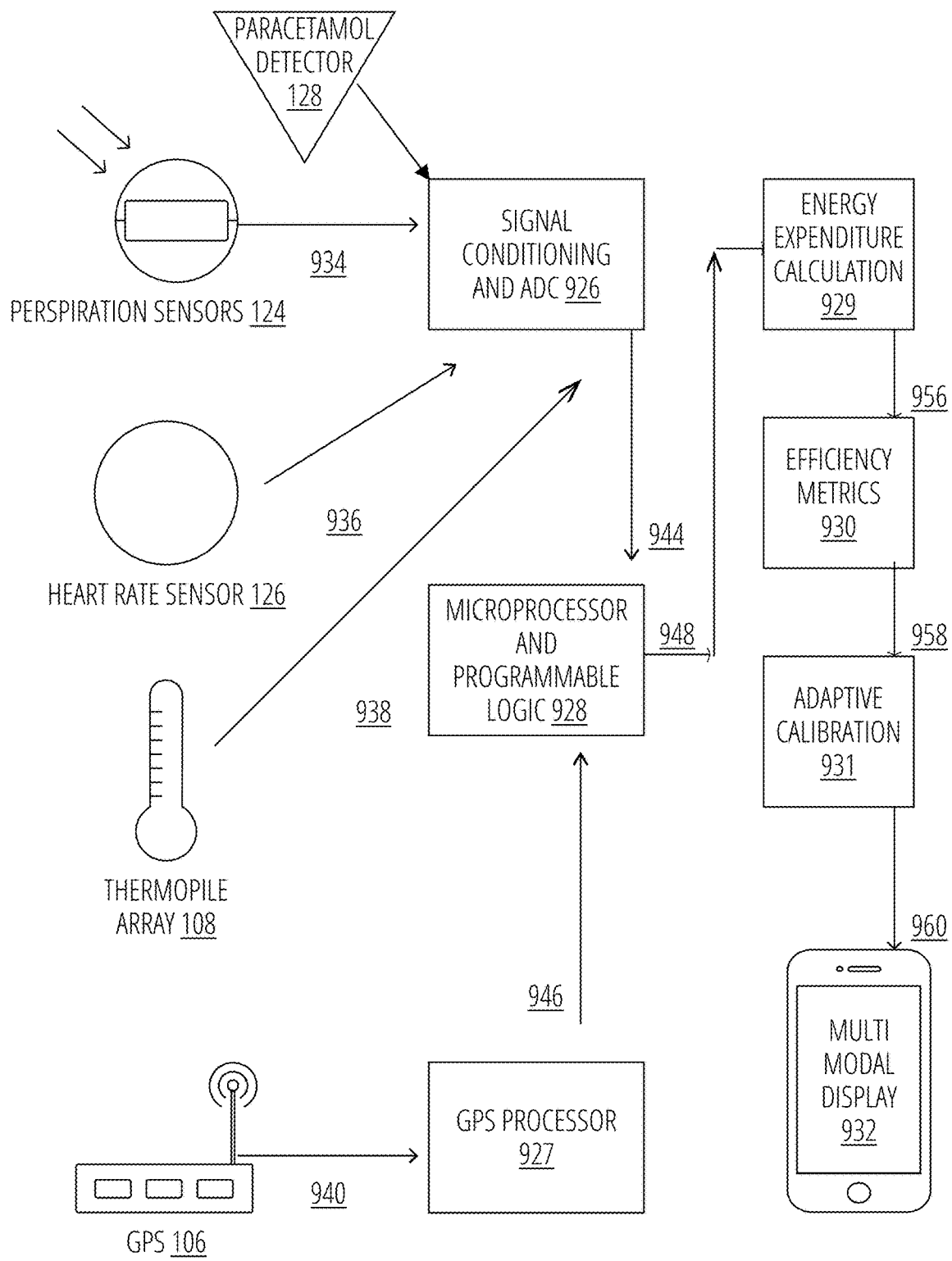
FIG. 9: depicts signal flow and processing.

FIG. 9 depicts the major elements of the system and the signal flow among them.

The system elements, the thermopile array 108, perspiration sensors 124, paracetamol detector 128, and heart rate sensor 126, send signals to the signal conditioning and analog-to-digital conversion (ADC) 926 subsystem from which digital data is fed to the microprocessor and programmable logic 928. The GPS 925 sends data to a GPS processor 927, which sends data to the the microprocessor and programmable logic 928. The microprocessor and programmable logic 928 integrates the data and sends them to the energy expenditure calculation 929 subsystem, which normalizes them with efficiency metrics 930, and adaptive calibration 931 and then provides data to the multi modal display 932. Elements 934, 936, 938, 940, 944, 946, 948, 956, 958, and 960 are digital connections, which may be implemented on a single wired or wireless data bus.

Programmable Logic and Efficiency Computation

Basic sensor technology is well known or beginning to emerge from the laboratory environment. Off-the-shelf, however, the products are not easily integrated. Sensors suitable for performing each of the functions of the invention, heart rate, heatflux, and perspiration measurement, in isolation, are available in the market. No claim is made for the basic design of any such sensors. But the available sensors operate at different supply voltages and transmit data in different forms. Normalizing their inputs and outputs so their signals can be integrated and analyzed is a major challenge addressed by the invention.

Figure 10:
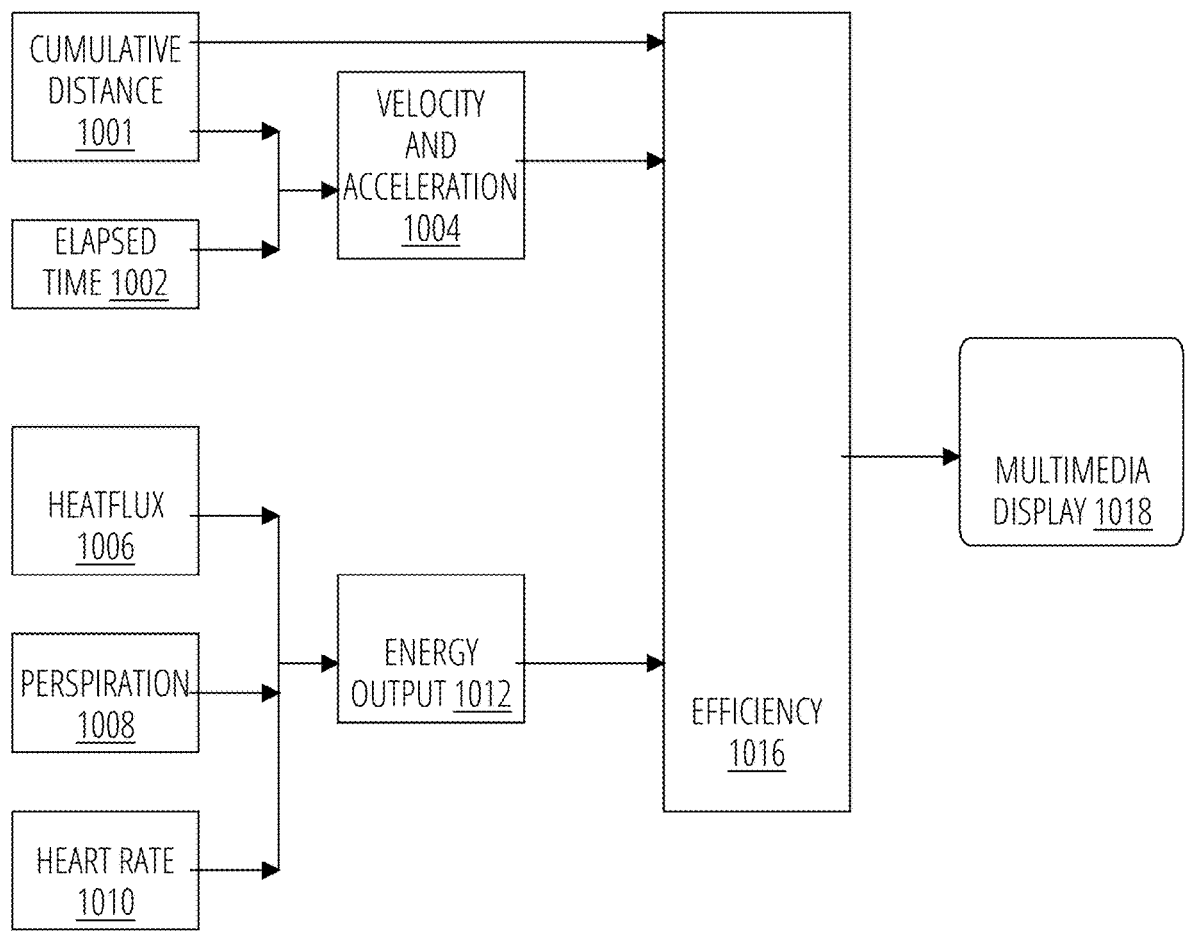
FIG. 10 is a block diagram of the programmable logic system for energy expenditure and efficiency computation

FIG. 10 depicts basic steps in computing values. Cumulative distance 1001 and elapsed time 1002 are combined to calculate velocity and acceleration 1004. Heatflux 1006, perspiration 1008, and heart rate 1010, are integrated to compute energy output 1012. Energy output 1012 is divided by velocity, acceleration, and cumulative distance to calculate efficiency 1016, which then is displayed on the multimedia display 1018.

The enhanced programmable logic system processes data from all four sensor modalities to compute real-time energy expenditure and movement efficiency metrics. The microprocessor 114 with embedded algorithms implements multimodal data fusion, energy expenditure calculation, and GPS-enabled efficiency computation.

For example, one embodiment takes the Mikro-Elektronika heart rate monitor, the Nix Sweatpatch perspiration monitor, and the FlexTeq heatflux monitor. The power requirements among these three products varies from 3.3 volts to 5 volts. And the signal outputs vary from 8 millivolts for the thermocouples to 0.5 volts for a heartbeat. Normalization of output signal levels could occur while they are still in analog form, but the invention digitizes them first and then effects the normalization computationally. Sampling rates are driven by the physiological phenomena being measured. Heart rate measurement utilizes faster sampling than heatflux or perspiration measurement. There is no point in having the system sample a sensor faster than the sensor itself samples its target phenomenon. Rather, the logic constructs a virtual timeline in which the samples taken by the sensors are interleaved.

The heart rate monitor produces an analog output ranging from 0.3 volts to 5 volts. The heatflux sensor array produces an analog output ranging from zero to 550 millivolts. The sweat sensor utilizing sodium measurement produces an output ranging up to 200 millivolts. The efficiency computation algorithms integrate the following relationships:

Distance and Time Calculation: Cumulative distance (D) and elapsed time (T) are calculated from GPS position data: $D=\Sigma\sqrt{[(x_{i+1}-x_i)^2+(y_{i+1}-y_i)^2]} T=\Sigma(t_{i+1}-t_i)$ Where $(x_i, y_i)$ are successive GPS coordinates and $t_i$ are corresponding timestamps.

Velocity and Acceleration Computation: Instantaneous velocity (V) and acceleration (A) are computed using GPS-derived position data with smoothing algorithms: $V=dD/dT$ with Kalman filtering for noise reduction $A=dV/dT$ with motion pattern recognition Calories Per Mile Calculation: The system computes metabolic efficiency using the relationship: Calories/Mile=Total Energy Expenditure/Distance Traveled Where total energy expenditure is derived from the integrated physiological sensors as previously described.

Calories Per Mile-Per-Hour Calculation: Movement efficiency relative to speed is computed as: Calories/(Mile×Hour)=(Total Energy Expenditure/Distance)/Average Velocity This metric enables optimization of pace for maximum efficiency across different speeds.

The programmable logic embedded in the microprocessor 114 software implements several sophisticated data manipulations:

Multi-Modal Data Fusion: A Kalman filter-based fusion algorithm combines data from all three sensors, weighting each input based on signal quality and physiological plausibility. The algorithm accounts for sensor cross-correlations and temporal dependencies.

Adaptive Calibration: Multiple-regression, Gaussian, and logarithmic machine learning models continuously refine energy expenditure calculations based on individual user characteristics, environmental conditions, and historical data patterns. The system builds personalized models that improve accuracy over time.

Motion Artifact Rejection: Advanced signal processing detects and compensates for motion artifacts in all sensor channels. The system employs accelerometer data and signal pattern recognition to maintain measurement accuracy during physical activity.

Environmental Compensation with GPS Integration: The logic embedded in the software automatically adjusts calculations based on ambient temperature, humidity, atmospheric pressure, and GPS-derived elevation, slope, and environmental conditions to maintain accuracy across varying terrains and climates.

GPS-Enhanced Motion Artifact Rejection: The system logic combines accelerometer data with GPS velocity vectors to distinguish between physiological motion artifacts and actual movement, improving sensor accuracy during various activities.

Programmable logic calculates calories per mile using a relationship: Calories/Mile=Total Energy Expenditure/GPS-derived Distance, where total energy expenditure is computed from integrated physiological sensor data The embedded processing implements machine learning for personalized efficiency modeling based on individual movement patterns, physiological responses, and GPS-derived activity characteristics, using data collected from the user over time, and applying multiple regression models in one embodiment, Gaussian models in another embodiment, and logarithmic.

Figure 11:
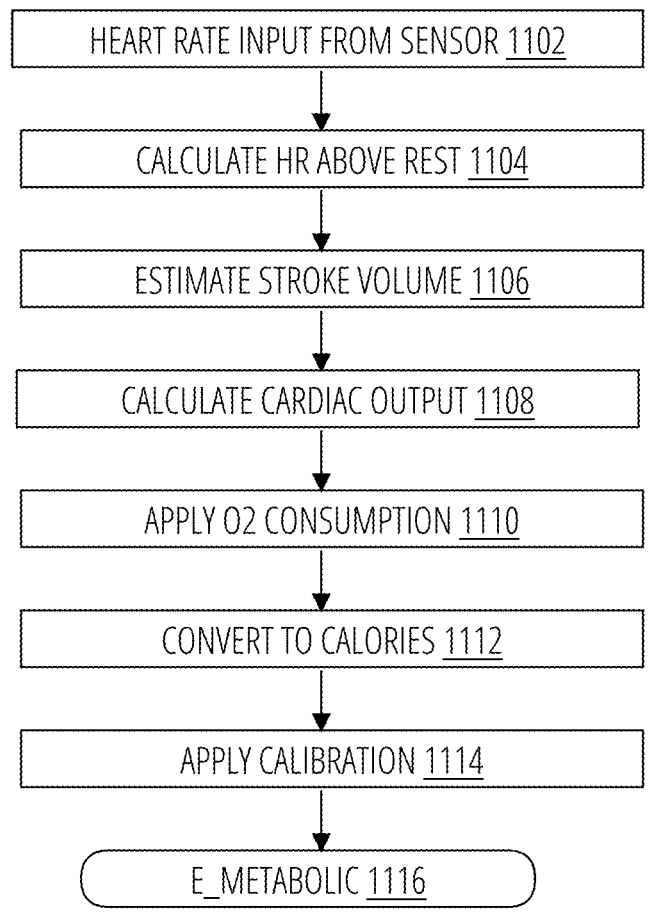
FIG. 11 shows how heart rate is used to compute energy expenditure.

FIG. 11 illustrates the calculation of metabolic energy expenditure, E_metabolic 1116, from heart rate input from sensor 1102, compared with resting heart rate to calculate HR (heart rate) above rest 1104, then estimating the stroke volume 1106, calculating cardiac output 1108, applying O2 consumption 1110, converting to calories 1112 and applying calibration 1114.

This heart rate-based measurement provides one of the three independent estimates of total energy expenditure that gets fused with heatflux and sweat analysis data for the most accurate result.

Figure 12:
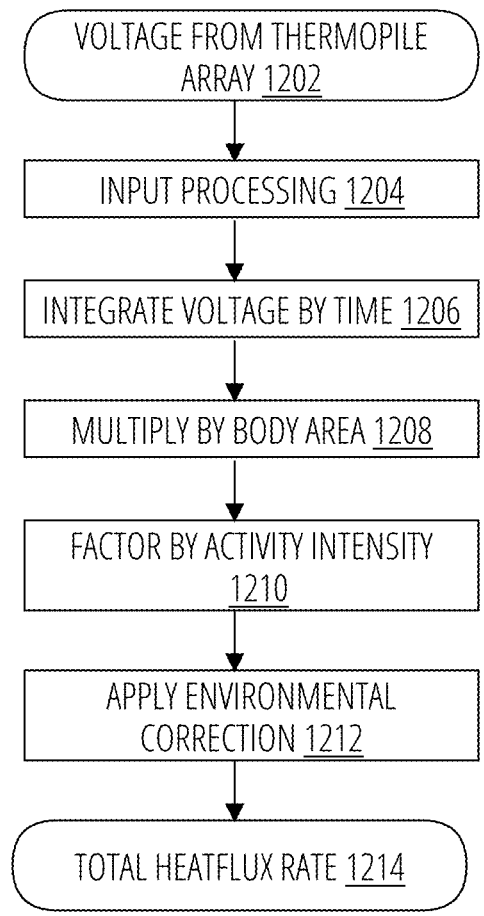
FIG. 12 shows how heatflux is used to compute energy expenditure.

FIG. 12 illustrates the calculation of energy expenditure from the heatflux measurement system. Voltage from the thermopile array 1202 is subjected to input processing 1204, then voltage is integrated by time 1206. The results are multiplied by body area 1208, which then is factored by activity intensity 1210. The result is total heatflux rate 1214.

In one embodiment an 8×8 thermopile array generates 64 individual voltage signals, voltage summation combines all elements, temperature measurement determines the difference between skin and ambient temperatures. Calibration factors are applied for sensor characteristics and contact area. Signal Processing involves amplification and filtering with gain of 100-1000, heat flux calculation using 2.5 mW/mV calibration, temperature validation ensuring reasonable ranges (5-20° C.), and contact area scaling accounting for imperfect contact.

The energy calculation equatiion is:

$$H\_transfer = q \times A\_eff \times K\_cal$$

Where:
q=heat flux density (mW/cm$^2$)
A_eff=effective contact area (cm$^2$)
K_cal=calibration factor Environmental compensation comprises ambient temperature compensation for varying thermal gradients.

Quality control comprises signal validation checking for reasonable voltage levels, error handling using average from valid array elements when some fail, and a feedback loop for continuous sensor monitoring.

Typical Values are:
Resting: 2-5 mW/cm$^2$
Light exercise: 5-15 mW/cm$^2$
Moderate exercise: 15-40 mW/cm$^2$
Vigorous exercise: 40-80 mW/cm$^2$ Conversion Factors are:
1 Watt=14.3 cal/min
Typical sensor: 1 mW/cm$^2$×12 cm$^2$≈0.17 cal/min Energy output is calculated from heat flux by integrating sensor voltage over time and multiplying it by body mass ratio to scale the sensor reading in millivolts per square millimeter to the total surface area of the body. The result is factored by activity intensity, determined from GPS accelerometer data.

This heatflux measurement provides one of the three independent estimates of total energy expenditure that gets fused with heart rate and sweat analysis data for the most accurate result.

Figure 13:
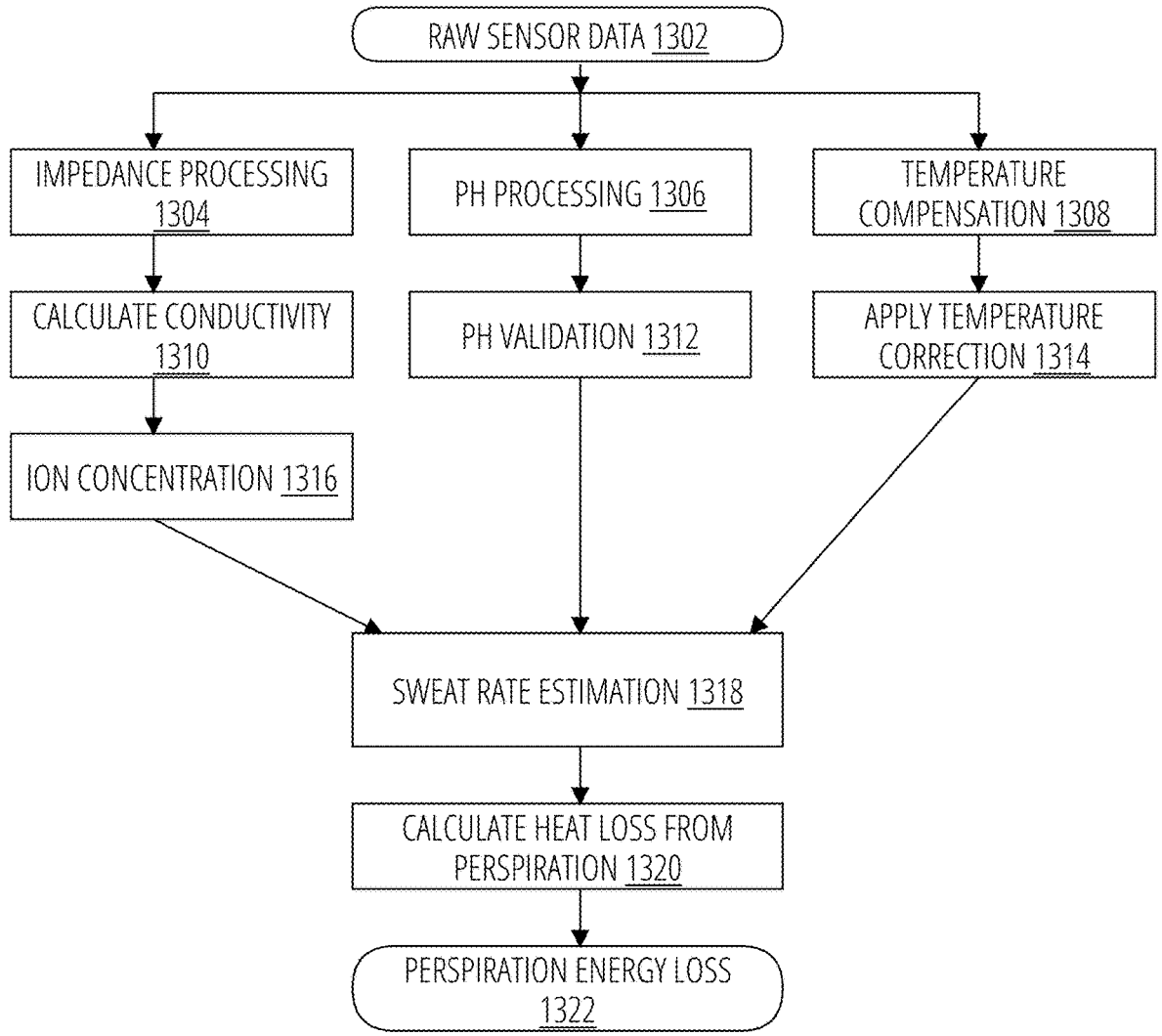
FIG. 13 shows how sweat rate is used to compute energy expenditure.

FIG. 13 illustrates sweat processing. Raw sensor data 1302 is simultaneously subjected to impedance processing 1304, pH processing 1306, and temperature compensation 1308. Then the system calculates conductivity 1310 and evaluates ion concentration 1316. pH validation 1312 is applied, along with applying temperature correction 1314. The results of these calculations are combined for sweat rate estimation 1318. That estimate permits heat loss from perspiration 1320 to be calculated, resulting in a determination of perspiration energy loss 1322.

This sweat rate measurement provides one of the three independent estimates of total energy expenditure that gets fused with heart rate and heatflux analysis data for the most accurate result.

Figure 14:
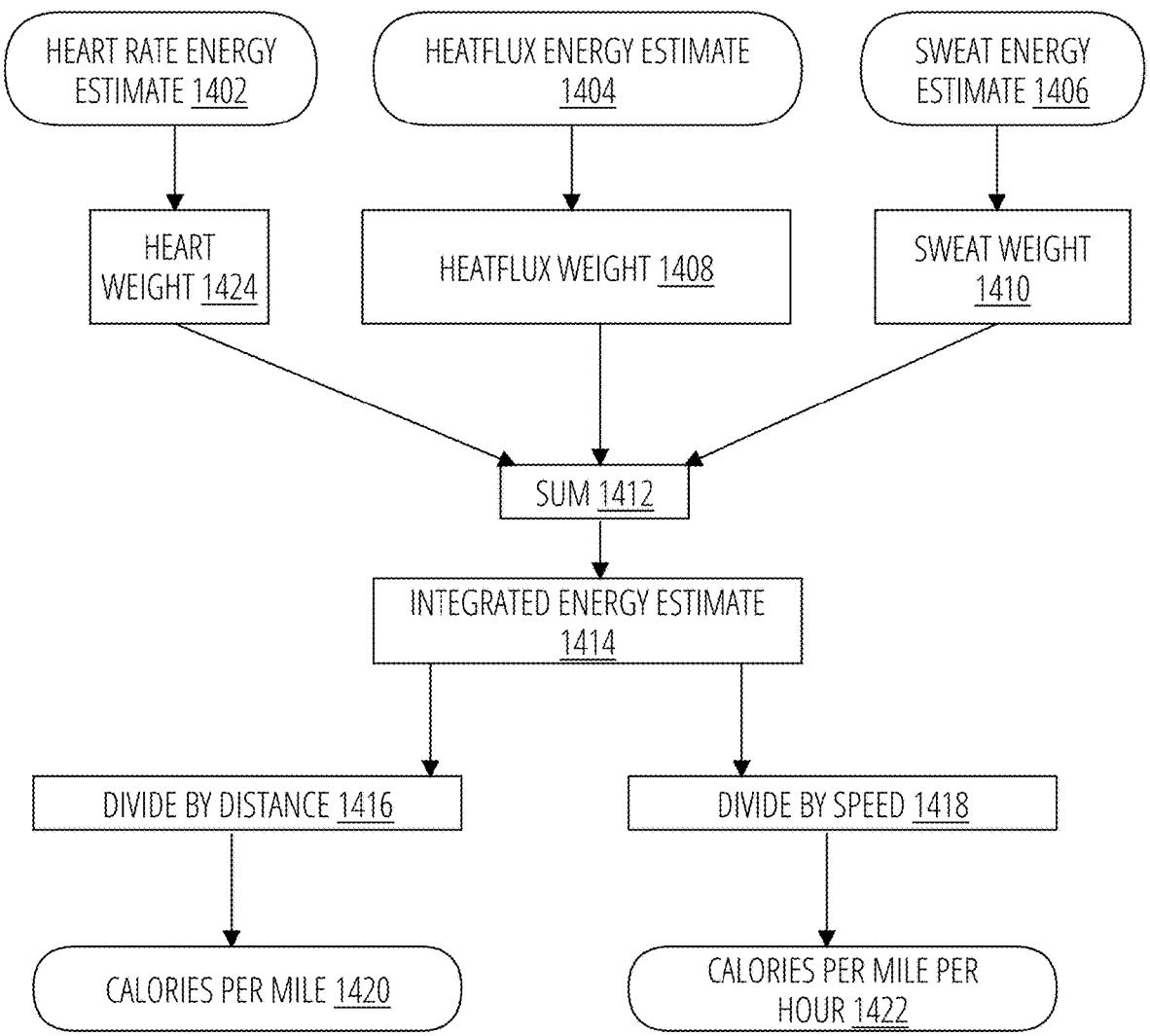
FIG. 14 illustrates the fusion or integration of the different measurements, heart rate, perspiration, and heatflux.

FIG. 14 illustrates the fusion or integration of the different measurements, heart rate, perspiration, and heatflux. The quantity for each is factored by weights, which vary according to environmental conditions and type of activity. In one embodiment, the invention weights heart rate by 0.6, heatflux by 0.25, and sweat analysis by 0.15 for moderate exercise in good environmental conditions. In hot environments with high humidity, the weight for heart rate measurements decreases slightly to 0.55 while the weight for heatflux increases to 0.35, and sweat analysis weight decreases to 0.10.

The fusion begins with sensor values for heart rate energy estimate 1402, heatflux energy estimate 1404, and sweat energy estimate 1406. It factors these values by heart weight 1424, heatflux weight 1408, and sweat weight 1410, respectively and sums 1412 the results, producing an integrated energy estimate 1414. It then divides by distance 1416 to produce calories per mile 1420, where Calories/Mile=Total Energy Expenditure/GPS-derived Distance, and divides by speed 1418, to produce calories per mile per hour 1422: where Calories/Speed=(Total Energy Expenditure/(Distance)/Average GPS-derived Velocity).

The system adjust the weights dynamically as a function of ambient temperature and exercise intensity, measured by speed and acceleration. For steady state running or cycling, for example, the weight for heart rate increases to 0.65, while the weight for heatflux decreases to 0.20 and for sweat analysis to 0.15.

For efficiency measurement both components of work are considered, combined as a ratio in which internal work is divided by external work.

For hydration, the system generates recommendations as to how much liquid to drink and when, to balance sweat losses with GER.

Multimodal Display System

Figure 15:
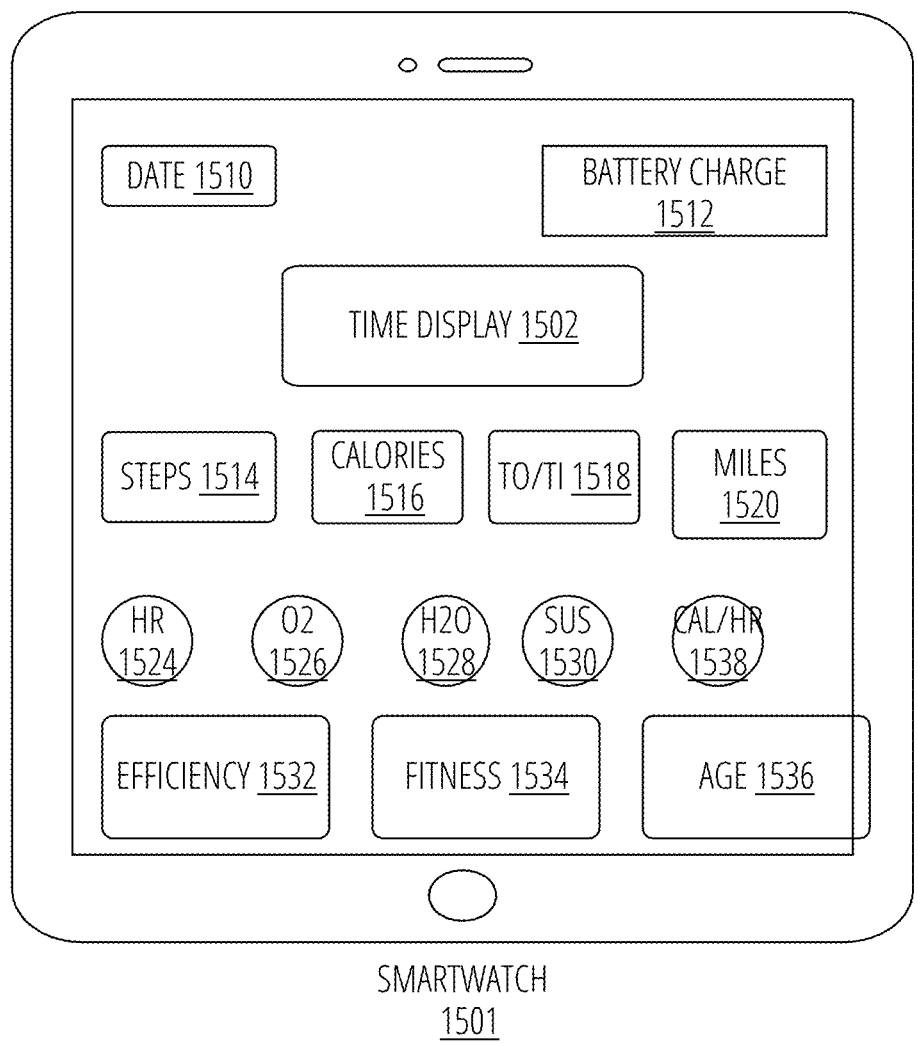
FIG. 15 illustrates a smartwatch interface displaying comprehensive performance analytics.

FIG. 15 depicts one embodiment of the multi modal display 932. Although the example routine depicts a particular arrangement of information, the arrangement and the items of information displayed may be altered without departing from the scope of the present disclosure. For example, some of the data may be displayed in different form, or other data elements may be included or excluded. Such differences do not materially affect the function of the display. In other embodiments, different arrangements or displays perform the same function.

In one embodiment, the display comprises a smartwatch 1501, and on the face of the watch a date 1510 display, a battery charge 1512 indicator, a time display 1502, a display of number of steps 1514, a display of calories 1516 expended, an outside temperature/body temperature (to/ti 1518) display, a cumulative miles 1520 display, a heart rate display (Hr 1524), a blood-oxygen concentration (O2 1526), display, a hydration (H2O 1528) display, a sustenance (sus 1530) display, an energy output (cal/hr 1538) display, an efficiency 1532 reading, a fitness 1534 level, and an age 1536. The fitness 1534 and age 1536 reading report quantities entered by the user in advance.

The efficiency display shows either calories per mile or calories per mile-per-hour, at the option of the user.

In one embodiment, the smartwatch 1501 is 2 inches in length, 1.7 inches in width, and 0.55 inches deep. It comprises a sapphire crystal display, display resolution of 500× 500 pixels, a lithium ion battery, and 32 gigabytes (GB) of digital memory.

The multi-modal display system provides flexible presentation of physiological and performance data across multiple device types and usage scenarios. At the user's option, the display of number of steps 1514 can be replaced by display of speed in miles or kilometers per hour.

The system interfaces with existing smartwatch platforms through standardized Bluetooth Low Energy (BLE) protocols.

Smartphone Application: A comprehensive smartphone application provides detailed analytics and historical trending. The application features include:

Real-time dashboard with all sensor data
Efficiency trending over time and across activities.
GPS route mapping with efficiency overlays
Comparative analysis between different activities, routes, and conditions
Social sharing capabilities with privacy controls
Integration with popular fitness platforms and health databases The smartphone app employs machine learning algorithms comprising multiple linear regression, Gaussian, and logarithmic methods to identify patterns and provide personalized coaching recommendations based on individual efficiency trends and physiological responses.

Bicycle handlebar application: a bicycle handlebar display unit with weatherproof housing and universal mounting system, adaptable for standard bicycle handlebars, including but not limits to dropped handlebars found on racing bicycles and some train bicycles, straight handlebars found on some over-the-road bicycles, and raised handlebars found on some sport bicycles. In one embodiment, the bicycle handlebar display unit comprises:

a 2.8-inch color liquid crystal display (LCD display) readable in direct sunlight;
weatherproof housing with IPX7 water-resistance rating;
universal handlebar clamp compatible with 25.4 mm to 35 mm diameter handlebars;
internal battery providing 20+ hours of operation.

In some embodiments, the handlebar display unit displays cycling-specific efficiency metrics, such as cadence, beats-per-minute, total watts or calories, watts or calories per minute, elevation, speed, time, and distance, as well as a moving map.

In some embodiments, the bicycle handlebar-mounted display system further comprises an internal battery, providing extended operation, standard USB-C charging capability, and automatic power management with activity-based wake/sleep functionality. In some embodiments, the bicycle handlebar-mounted display system provides wind resistance compensation, gear ratio efficiency analysis, and comparative performance metrics across different riding conditions.

Information display comprises synchronized presentation across multiple devices with user-adjustable alerts for efficiency thresholds, physiological limits, and performance optimization guidance.

Calibration and Testing

Figure 16:
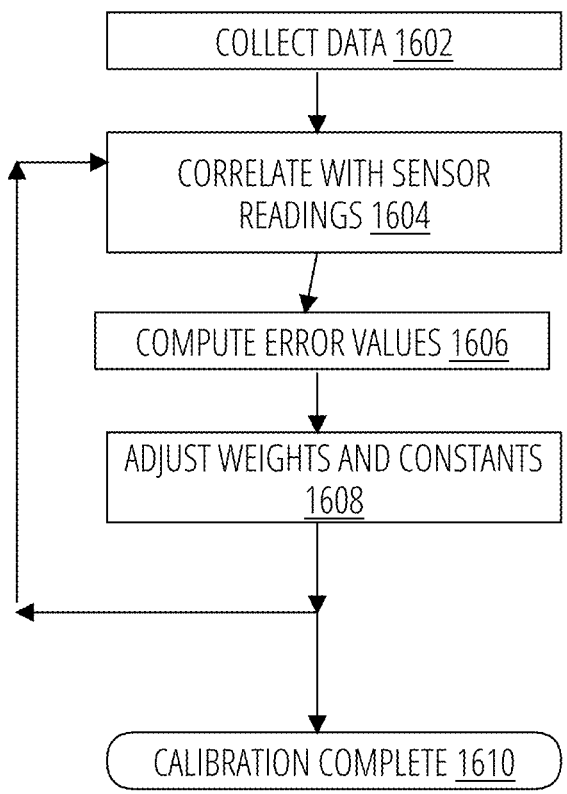
FIG. 16 provides an overview of the calibration process.

FIG. 16 illustrates calibration and testing of the system. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The calibration process begins by collecting external data 1602 on human athletic performance. It then correlates those data with sensor readings 1604 and computes error values 1606. It adjusts weights and constants 1608 to minimize the error values, and recomputes the correlations. When error values have reached minima, the calibration is complete 1610.

Calibration takes place at two levels. The first, highest, level is to correlate proxies such as heart rate, heat flux, and sweat rate with actual energy expenditure. The second, and lower, level is to correlate the values reported by the particular devices used in the invention with actual heart rate, heat flux, and sweat rate.

At both levels experiments measure actual values, indicated values, and arrive in equation for the relationship between the two.

A similar hierarchy of calibration is necessary for work performed. Calculations of work performed from the laws of physics must be made and then correlated with readings from sensors that measure distance, speed, acceleration, and elevation. In the immediate context, that means developing equations that relate GPS readings for distance, speed, acceleration, and elevation to the theoretical components of work.

Then, no second level of calibration is necessary; the GPS readings and the equations for combining them into work in the form of calories or watts are available for the model implemented in the invention.

The first or highest level of calibration for energy expenditure can be simplified because of the abundant literature relating heart rate, heat flux, and perspiration to total energy expenditure. The literature shows that heart rate is highly correlated with total energy expenditure and shows a linear relationship except at very high levels of energy, when heart rate plateaus. It shows that heat flux is highly correlated with total energy expenditure but that its measurements are dependent on environmental conditions, particularly ambient temperature. It also shows that sweat production is highly correlated with total energy expenditure but that its relationship is nonlinear and sensitive to environmental conditions, particularly heat and humidity Step one of the calibration appropriate for the invention simply takes those accepted values from the literature. Then, experiments are performed to collect values measured by the three different kinds of sensors for different demographic groups, different environmental conditions, and different fitness levels and to correlate them with the accepted values. Error terms thus are generated, representing the difference between the values measured by the invention sensors and the values known from the literature to be associated with that particular level of expenditure by the particular test subject.

At least fifty instances are desirable for good calibration. The instances should span a range of activities, from resting, to walking, to jogging, to running at an eight minute per mile pace, to running at a six minute per mile pace, to sprinting, to bicycling. It should include male and female subjects and age levels of 18, 26, 30, 40, 50, and 60, with fitness levels of sedentary, moderate, and athletic and should include at least three levels each of ambient temperature, wind, and slope. All possible permutations total 2268, but reasonable assumptions, such as constant effects of ambient temperature, wind, and slope across the other categories, can reduce the number of test incidents required to the order of 75 or so.

For curve fitting, multiple regression analysis is appropriate to capture different contributions by the different biometric measures. Some relationships, for sweat data, are shown by the literature to be significantly nonlinear. For them Gaussian and logarithmic curve fitting techniques should supplement regression to find the best mathematical relationship.

An alternative embodiment would retest the relationships between the ground values of heart rate, heatflux, and sweating and total energy expenditure. The gold standard for measuring total energy expenditure is the double labeled water method (DLW) it uses stable isotopes of oxygen and hydrogen to measure total energy expenditure. But DLW is expensive, requires expert interpretation, and produces daily values rather than values fluctuating as energy levels fluctuate.

Nearly as accurate is direct calorimetry, which uses a suit, room or liquid bath to measure heat output of the human body directly. That method is nearly as accurate as DLW, but it is expensive and requires careful control of conditions.

The usual choice is indirect calorimetry, which measures oxygen and carbon dioxide inspiration and expiration. The formula is well known: energy expenditure in kilocalories equals 3.941 times the volume of oxygen consumed plus +1.106 times a volume of CO2 produced.

Knowing the surface area of a user is important to calculate both heat flux and perspiration. Absolute values of surface area can be calculated by the well-known Archimedes principle, where the surface area of an object completely submerged in the liquid is equal to the rise in the level of liquid after immersion during immersion, times the area of the liquid surface. A much simpler approach is to use the well-known Mosteller method for calculating body surface area as a function of height and weight. Many studies validate its accuracy, and users easily can enter their height and weight into the control device for the invention.

The external work measurement can be used to calibrate the system. It is a physical fact that external work cannot exceed internal work; otherwise one could complete a marathon while remaining in bed asleep. Internal work almost always is greater than external work because of various inefficiencies. If the system detects a value for external work that exceeds the value it has computed for internal work, it displays an error message and indicates the nature of the error.

Most of the calibration takes place at the point of production, so that the system is delivered to users ready to operate. The user need enter only weight, height, and basic fitness level, such as sedentary, moderately active, and athletic.

The embedded processing implements machine learning based on multiple regression, Gaussian, and logarithmic fitting means for personalized efficiency modeling based on individual movement patterns, physiological responses, and GPS-derived activity characteristics.

Figure 17:
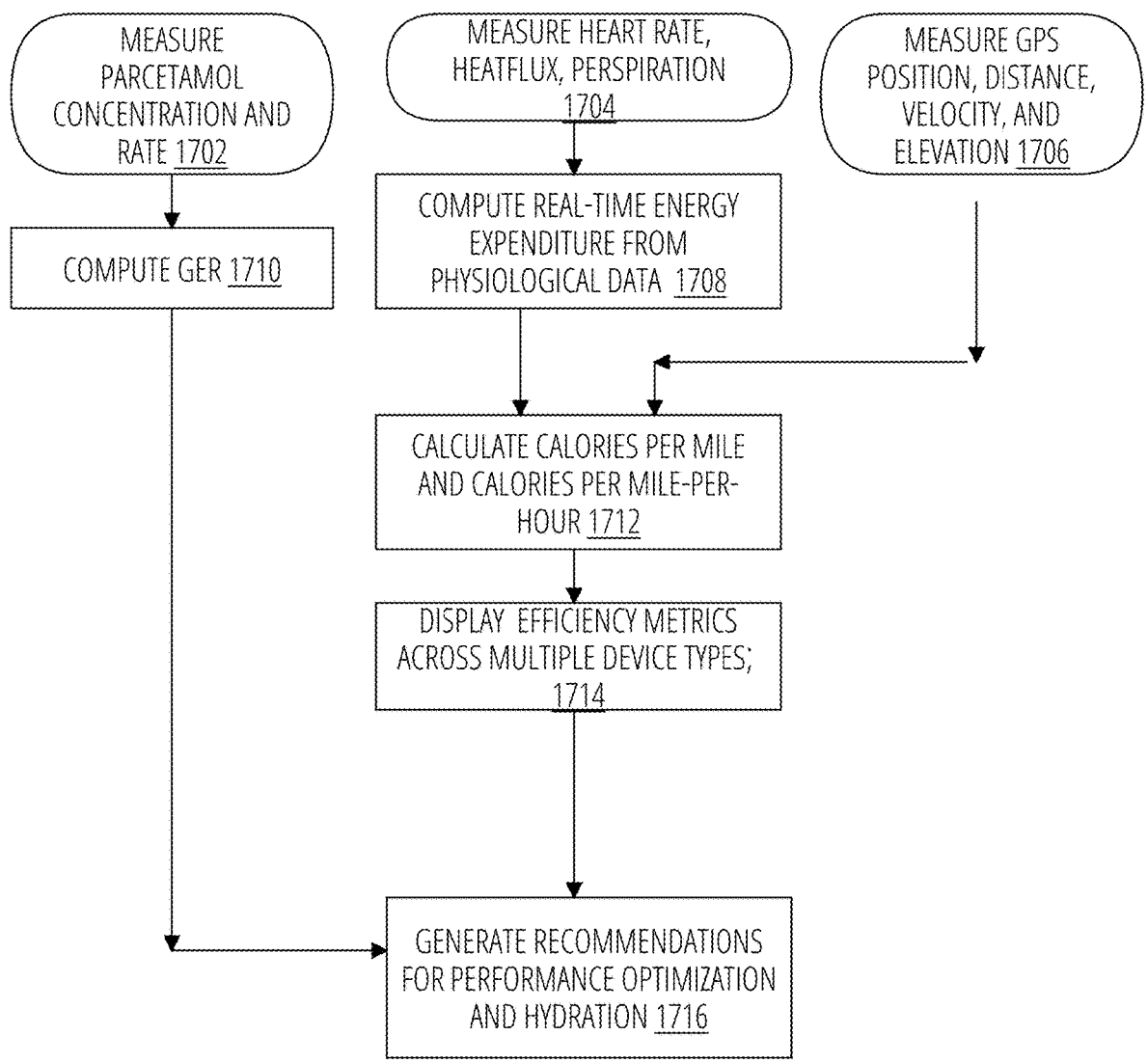
FIG. 17 is a flowchart showing how sensor date is integrated and processed to produce efficiency readings and recommendations.

FIG. 17 is a flow chart showing the method of use of the system. It comprises measuring heart rate, heatflux, and perspiration 1704, measuring GPS position, distance, velocity, and elevation 1706, and measuring parcetamol concentration and rate 1702, in parallel. Then the method includes computing real-time energy expenditure from physiological data 1708, calculating calories per mile and calories per mile-per-hour 1712, displaying efficiency metrics across multiple device types 1714. GER is computed 1710 from paracetamol concentration and rates. All values enable the generation of recommendations for performance optimization and hydration 1716.

Thermoelectric Power Supplement

The thermopile array 922 generates more electrical power than the ADC circuit of the microprocessor requires. For example some FET used as ADCs and associated amplifiers accept input currents as low as 10 pA, while few thermocouples can produce more than 1.6 mA. That leaves on the order of 1.5 mA from each thermocouple for uses other than signal input to the system. In a 64 thermocouple thermopile array, the available current ranges from 1.5 mA to 96 mA, depending on whether thermocouples are connected in series or parallel. The maximum charging rate for charging a smartwatch is on the order of 200 mA, so the power available from the thermopile array is sufficient to keep the battery for the system reasonably well charged. Even if the discharge rate of the battery exceeds the power available from the thermopile array 108 because of electrical power demands from other elements of the system, the power from the thermopile array 922 prolongs the endurance of the system before it requires access to an external charger.

Manufacturing and Materials

The device is fabricated using advanced flexible electronics manufacturing techniques optimized for multi-sensor integration. The flexible substrate is produced using standard PCB (printed circuit board) fabrication processes adapted for polyimide substrates with additional layers to accommodate the GPS antenna and enhanced wireless capabilities.

Main Device Manufacturing:

Substrate fabrication: 6-layer flexible PCB with embedded ground planes for GPS signal isolation • Component placement: High-precision pick-and-place assembly with specialized fixtures for GPS Module Alignment Antenna integration: Ceramic patch antenna bonding with impedance matching networks Protective encapsulation: Multi-layer biocompatible polymer coating with selective permeability for sensors Bicycle Handlebar Display Manufacturing: The Handlebar Display Unit Employs Ruggedized Construction Suitable for Outdoor Cycling Conditions:

Housing material: PC/ABS polymer blend with UV (ultraviolet) stabilizers and impact resistance. Display assembly: Bonded LCD with anti-reflective coating and LED backlighting Sealing system: IPX7 waterproof rating with membrane-sealed button interfaces Mounting hardware: Anodized aluminum clamp mechanism with stainless steel fasteners Quality Control and Standards Compliance Environmental testing: Temperature cycles (−20° C. to +60° C.), humidity resistance, vibration testing GPS performance validation: Signal acquisition testing in various environments Wireless interoperability: Compatibility testing across multiple device platforms Biocompatibility certification: ISO 10993 compliance for extended skin contact All materials in contact with skin are selected for biocompatibility according to ISO 10993 standards. The device is designed for extended wear periods of up to 14 days without skin irritation, with the enhanced battery capacity supporting longer monitoring durations.

We claim:

1. An integrated physiological monitoring system comprising:
   a flexible substrate configured for skin contact;
   a plurality of sensors, each disposed on said substrate, comprising:
      a perspiration sensing system, comprising interdigitated electrodes for measuring sweat conductivity;
      a heatflux sensing system, comprising a thermopile array for measuring heat flux between skin and ambient environment;
      a heart rate sensing system, comprising a photoplethysmography sensor;
   a GPS positioning system disposed on said substrate, comprising a multi-constellation GNSS receiver for determining position, distance, velocity, and acceleration;
   a microprocessor disposed on said substrate configured to receive data from the plurality of sensors, and the GPS positioning system;
   a battery disposed on said substrate providing electrical power to the purality of sensors;
   programmable logic executed by said microprocessor, configured to compute energy expenditure, calories per mile, and calories per mile-per-hour by relating data from said plurality of sensors with GPS-derived distance and time measurements;
   a wireless communication system disposed on said substrate for transmitting computed metrics and for connecting to optional sensors; and
   a multi-modal display interface supporting smartwatch, smartphone, and bicycle handlebar-mounted display options.

2. The integrated physiological monitoring system of claim 1, wherein the plurality of sensors also comprises a microneedle array with suitable enzyme coatings for measuring paracetamol in a user's blood.

3. The integrated physiological monitoring system of claim 1, wherein said programmable logic calculates the calories per mile using a relationship: Calories/Mile=Total Energy Expenditure/GPS-derived Distance, where total energy expenditure is computed from integrated physiological sensor data.

4. The integrated physiological monitoring system of claim 1, wherein said programmable logic also calculates the calories per mile-per-hour using a relationship: Calories/Speed=(Total Energy Expenditure/(Distance)/Average GPS-derived Velocity).

5. The integrated physiological monitoring system of claim 1, wherein said GPS positioning system comprises a multi-constellation GNSS receiver capable of receiving signals from GPS, GLONASS, Galileo, and BeiDou satellite systems with position accuracy of ±2 meters.

6. The integrated physiological monitoring system of claim 1, wherein said multi-modal display interface comprises:
   a Bluetooth Low Energy connectivity for smartwatch integration;
   a smartphone application with comprehensive analytics and route mapping;
   a bicycle handlebar display unit with weatherproof housing and universal mounting system.

7. The integrated physiological monitoring system of claim 1, further comprising real-time efficiency optimization algorithms that provide pacing recommendations based on current physiological state, gastric emptying rate (GER) data, GPS-derived terrain analysis, and target performance goals.

8. The integrated physiological monitoring system of claim 1, wherein said wireless communication system comprises a plurality of wireless modules including WiFi, Bluetooth Low Energy, and ANT+ protocols for simultaneous connection to multiple display devices.

9. The integrated physiological monitoring system of claim 1, further comprising enhanced power management with GPS-optimized duty cycling that adjusts GPS update rates based on movement patterns and activity type.

10. The integrated physiological monitoring system of claim 1, wherein said programmable logic implements terrain-adjusted efficiency calculations using GPS-derived elevation data to account for grade and environmental factors in energy expenditure per distance computations.

11. The integrated physiological monitoring system of claim 1, further comprising:
- a charging system connected to the battery; and
- a circuit that receives electrical current from the heatflux sensors and makes it available to the charging system.

* * * * *